United States Patent Office 3,366,456
Patented Jan. 30, 1968

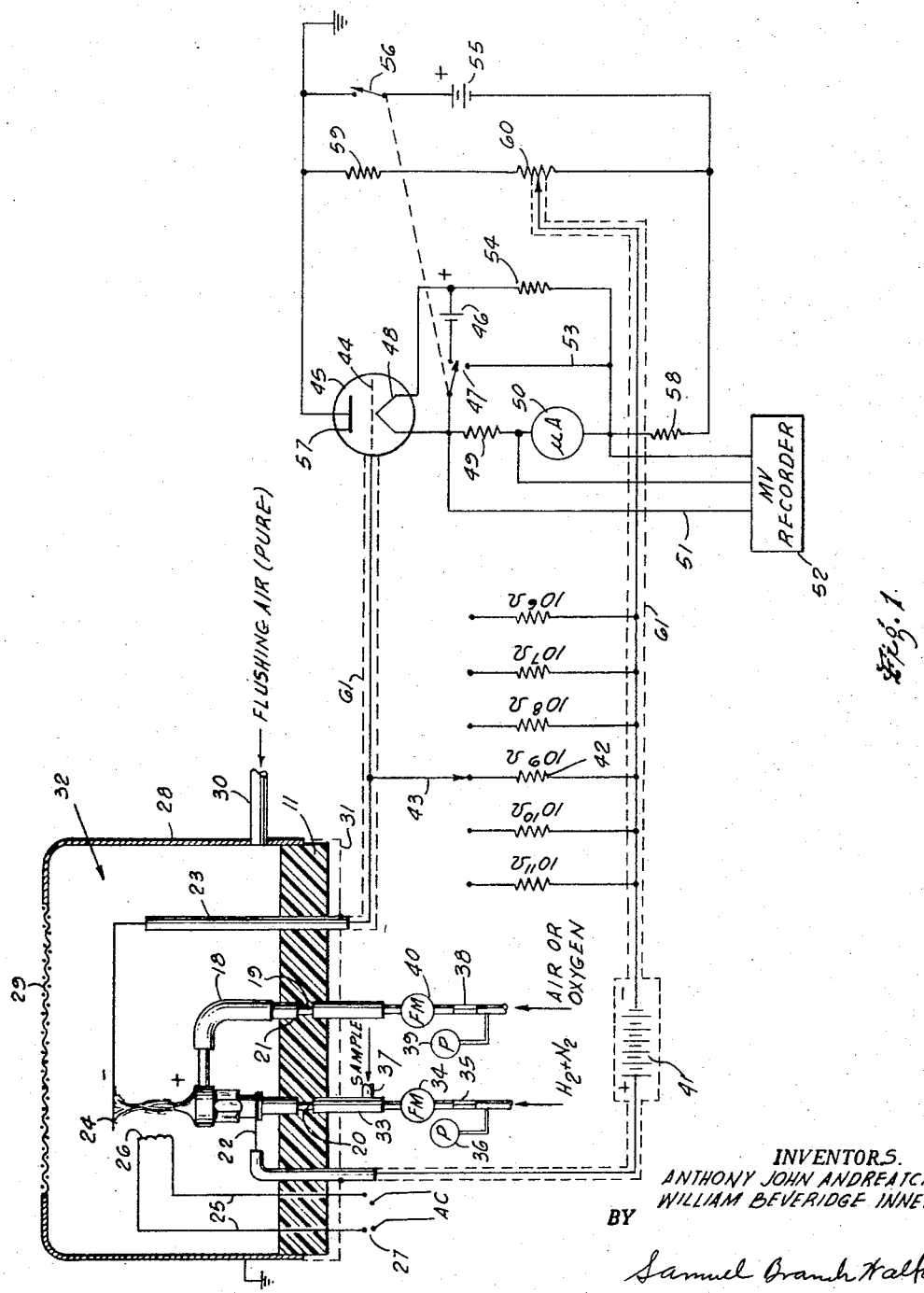

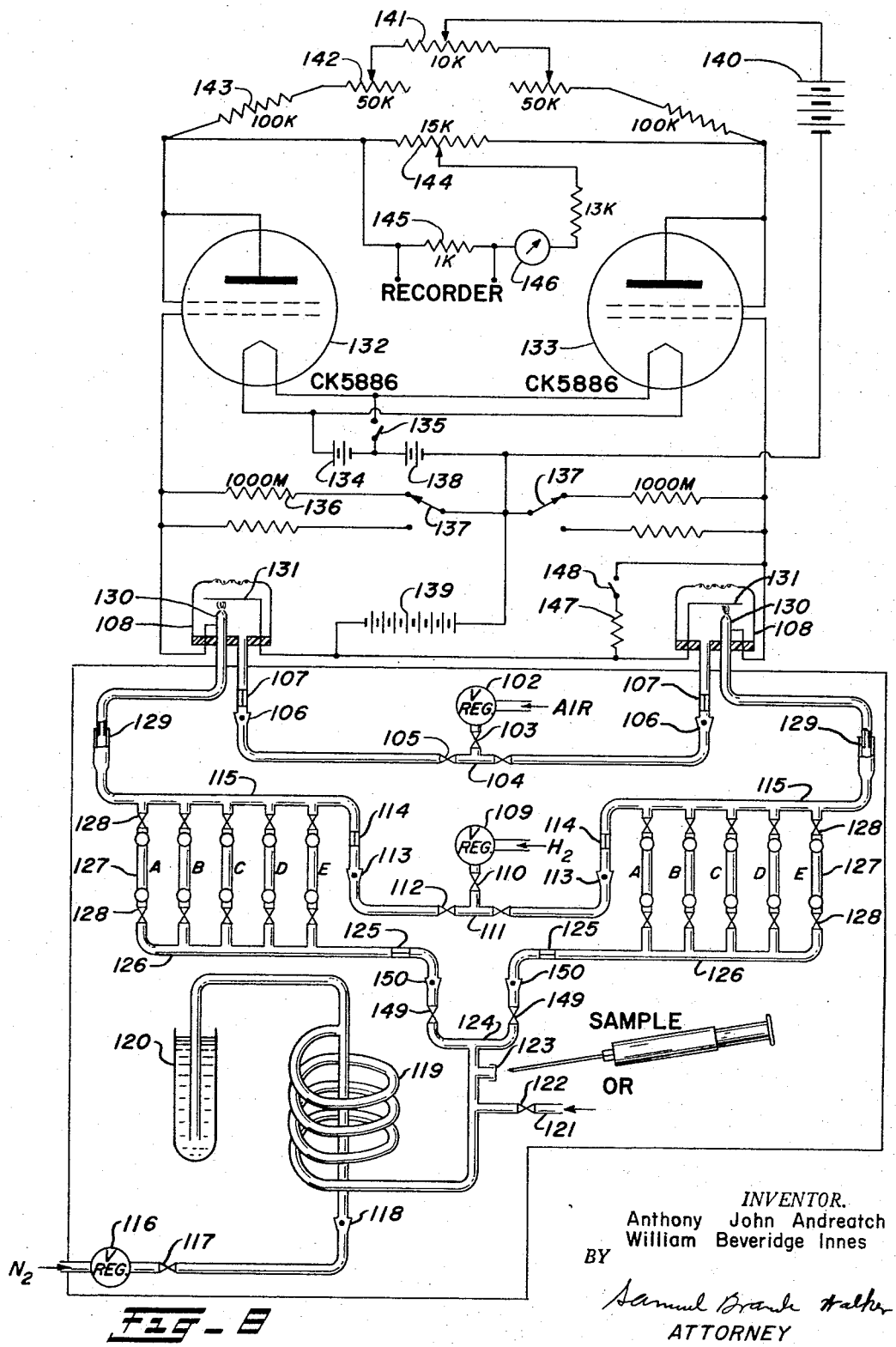

3,366,456
ANALYSIS EMPLOYING A HYDROGEN FLAME IONIZATION DETECTOR
Anthony John Andreatch and William Beveridge Innes, Stamford, Conn., assignors to American Cyanamid Company, Stamford, Conn., a corporation of Maine
Continuation-in-part of application Ser. No. 856,596, Dec. 1, 1959. This application Mar. 23, 1962, Ser. No. 181,931
14 Claims. (Cl. 23—230)

This application is a continuation-in-part of our application Ser. No. 856,596, filed Dec. 1, 1959, "Air Pollution Measurement," now U.S. Patent 3,027,241, issued Mar. 27, 1962.

This invention relates to a method for the continuous analysis of a gas stream for hydrocarbons and halocarbons including compounds containing a carbon to hydrogen bond, and to methods for utilizing a continuous gas analyzer, for hydrocarbons or halocarbons, particularly for the analysis of the products of combustion of internal combustion engines, including air contaminated with such products, but including chromatographic column streams, differential analysis, as in petroleum exploration, or leak detection, acetylene from the action of water on calcium carbide, for indirect water analysis, etc. The method includes the analysis of gas streams or discrete samples containing such hydrogen to carbon or carbon to halogen compounds whether direct, as samples of the human breath, or indirect as by passing a carrier gas through a sample of body fluid, as blood or urine, and using the vapors as a sample. The electrical conductance of various flames have been the subject of much study. Early work is reviewed by F. L. Tufts, "The Phenomena of Ionization in Flame Gases and Vapors," Physical Review, volume XXII, 193 (1906). This article shows that alkali metal salts, such as sodium chloride, cause conduction in the flame, and are undesirable impurities where flame conduction of other ions is being measured.

The electrical conductivity of a flame has been used as a rectifier, at least as early as 1905, Lee DeForest, United States Patents 824,638, "Oscillation-Responsive Device," and 867,878, "Oscillation Detector." The conductivity of a flame has been used to detect the presence of a flame, Cockrell, United States Patent 2,112,736, "Flame Detector," Mar. 29, 1938. The conductivity of a flame has been used to measure the air-fuel ratio, United States Patent 2,324,821, Campbell, "Measuring and Control Method and Apparatus," July 20, 1943; United States Patent 2,511,177, D. E. Richardson, "Apparatus for Measuring the Composition of a Gas," June 13, 1950; United States Patent 2,622,962, R. R. Lobosco, "Automatic Gas Ratio Sampling Device." The use of more sensitive detectors for measuring gas compositions at lower carbon-hydrogen concentrations, particularly in conjunction with a chromatographic column is disclosed by I. G. McWilliam and R. H. Dewar, Nature, volume 181, 177 (1958) and by J. Harley, Nature, volume 181, 177 (1958); and United States Patent 2,991,158, J. Harley, "Apparatus for the Analysis and/or Detection of Substances by Gas Chromatography," July 4, 1961; and Australian Patent 224,504, "An Apparatus for Detecting the Presence of Organic Gases and Vapours," Oct. 21, 1959, I. G. McWilliam.

The present system of analysis is based upon the electrical conductivity of a burning hydrogen-oxygen jet, to which flame is fed the stream to be analyzed. A high impedance voltmeter is used to measure the electrical resistance between the jet and an electrode suspended in the flame. Such a flame detector alone, or in a bridged system, has sensitivity to measure less than 5 parts per billion of hydrocarbon expressed as methane using laboratory gases. With specially purified gases in all streams such as are obtained by passing gas streams over glowing platinum, hydrocarbon impurities can be oxidized or cracked if no oxygen is present, nitrogen, oxygen and hydrogen and ambient air may be prepared which has a very low hydrocarbon content. With such precautions, a sensitivity of at least as low as 0.1 part per billion can be obtained. Most laboratory gases, and laboratory air contain some hydrocarbons, and such hydrocarbons increase the noise level.

This very sensitive measurement permits use in detecting and measuring the hydrocarbon and halocarbon content in dilute streams, and is particularly useful in analyzing the products of imperfect combustion in the exhaust streams of internal combustion engines.

The present flame ion detector is not sensitive to carbon dioxide, carbon monoxide, the oxides of nitrogen, carbon disulfide, sulfur dioxide, water vapor, etc.

The flame ion detector utilizes ions and/or electrons produced in combustion and such ions and electrons are produced by the rupture of carbon to hydrogen bonds and carbon to halogen bonds as for example in carbon tetrachloride, chloroform, methane, ethane, and the like. Conductivity is largely a function of the total carbon present which carbon is in compounds containing carbon to hydrogen or carbon to halogen linkages. The relative reading is normally a function of the number of carbon atoms which have a hydrogen or halogen attached to that carbon atom, hence per mol of gaseous compound a relative reading of 1 would be obtained for methane, a reading of 2 for ethane, ethylene and acetylene and ethanol. A reading of 3 would be obtained for propane, propylene, cyclopropane, propanol, etc. A reading of 4 is obtained for butene, isobutene, butene-1, butene-2, isobutylene, butadiene, butanol, isobutenol, and the like. A reading of about 6 is obtained from hexane, benzene, cyclohexane, etc. The reading for the halogenated hydrocarbons such as chloroform or the totally halogenated hydrocarbons such as carbon tetrachloride is less than for the carbon-hydrogen type of bonds. Inasmuch as approximately the same response is obtained for both saturated and unsaturated hydrocarbons the present detector is particularly useful for analyzing the products of combustion of an internal combustion engine. The relative response is shown in the following table:

TABLE 1.—RELATIVE RESPONSE OF DETECTOR

| Compound | Relative Response, per unit weight | Relative Response, per mole | Carbon No. |
|---|---|---|---|
| Methane | 3.4 | 0.95 | 1 |
| Ethane | 3.9 | 2.0 | 2 |
| Ethylene | 4.1 | 2.0 | 2 |
| Acetylene | 4.9 | 2.2 | 2 |
| Propane | 3.9 | 3.0 | 3 |
| Propylene | 4.0 | 2.9 | 3 |
| Cyclopropane | 4.3 | 3.1 | 3 |
| Butane | 4.0 | 4.0 | 4 |
| Isobutane | 4.0 | 4.0 | 4 |
| 1-butene | 4.1 | 4.0 | 4 |
| 2-butene | 4.0 | 3.9 | 4 |
| Isobutylene | 4.0 | 3.9 | 4 |
| 1,3-butadiene | 4.3 | 4.0 | 4 |
| Hexane | 4.2 | 6.3 | 6 |
| Benzene | 4.3 | 5.8 | 6 |
| Cyclohexane | 4.3 | 6.3 | 6 |
| Heptane | 4.3 | 7.4 | 7 |
| Methanol | 1.49 | 0.83 | 1 |
| Ethylalcohol | 2.6 | 2.0 | 2 |
| Carbon tetrachloride | 0.24 | 0.64 | 1 |
| Chloroform | 0.40 | 0.85 | 1 |
| Freon® 12 | 0.19 | 0.40 | 1 |
| Vinyl chloride | 1.61 | 1.75 | 2 |
| Carbon monoxide | 0 | 0 | 1 |
| Carbon dioxide | 0 | 0 | 1 |
| Nitrous oxide | 0 | 0 | 0 |
| Carbon disulfide | 0 | 0 | 1 |

The products of combustion of the internal combustion gasoline engine and diesel engine are blamed for the production of the smog which is such a problem in air pollution in certain cities, particularly Los Angeles. One of the big problems has been the method of measuring both the contaminants in the air and contaminants or unburned organic material in the exhaust stream. In the past such devices as infrared analyzers have been used. Such infrared analyzers are quite bulky, require considerable skill to handle and are comparatively slow. The present device has a far greater sensitivity than any previous device known, is fast, economical and easy to operate.

In the analysis of untreated exhaust gases by the non-dispersive, infrared, hexane analyzer, the hydrocarbon response is about ½ that obtained by flame ionization. The hexane infrared analyzer has a selective response for hexane type hydrocarbons but has a very low response to the lower olefins, acetylene and the aromatics.

The California standard for hydrocarbon emission, setting an upper limit of 275 p.p.m. hexane as measured by a hexane infrared analyzer is questionable because it is based on a hydrocarbon measurement which is not indicative of the true smog producing hydrocarbons. The development of a composite infrared detector which was sensitized with benzene, acetylene and ethylene and gave a response which was proportional to the carbon content. This detector also responded to olefins, acetylene and aromatics. The response obtained on exhaust gases was 2 to 3 times that obtained by the hexane detector depending on the mode of engine operation. The composite infrared detector is not suitable for the analysis of treated exhaust gases because of interference due to $CO_2$ and $H_2O$ and insufficient sensitivity.

The flame ionization detector is good for this application because it responds to all hydrocarbons and has no response to $CO_2$ or $H_2O$. The total hydrocarbon content of a gas is measured on the flame unit by passing the gas directly into the flame. The analysis may be made continuously or periodically.

By measuring products of combustion in a gas stream and then passing such an exhaust gas stream through a catalyst system and again measuring, the efficacy of the catalyst system to oxidize the unsaturated and other unburned hydrogen-carbon compounds is easily determined. The use of more effective catalysts or after-burners is one method of solving the pollution problem.

As used in this application the term hydrogen-carbon compounds is defined as those compounds having hydrogen to carbon bonds. This includes nearly all organic compounds.

If the hydrogen-carbon compounds are not slightly volatile, the compounds can be detected when suspended as a dust, or aerosol, and so carried to the flame of the flame ion detector.

The present detector is sufficiently sensitive to detect and measure hydrogen-carbon impurities in the air in American cities. This is important for determining levels of air pollution and their sources and for air pollution research. At least small quantities of methane seem to be a normal constituent of the earth's atmosphere at the surface.

The exhaust gases or air containing exhaust gases or other unburned hydrocarbons may be measured directly to determine the quantity of hydrogen-carbon containing components present, or it may be passed through a chromatographic column to selectively absorb certain of these components and delay their rate of passage. By using such a system the various individual components are separated and analyzed. Thus it is possible to directly and without preliminary concentration detect and measure the individual amounts of methane, ethane, acetylene, ethylene, butene, butadiene, butane and pentane, etc. where the amounts of each are measured in parts per billion and the total amount is less than 1/10 of a part per million. Such a sensitivity is both unexpected and most useful. For the first time the present device makes possible the direct determination of the hydrogen-carbon components present in contaminated air from which smog is produced. It also becomes possible for the first time to determine the relative effects of various components so that efforts may be made to selectively remove or dispose of the more disadvantageous products before they are released to the air.

Solid carbon compounds which volatilize and decompose at flame temperatures are also measured. Hence, solid carbon compounds or hydrogen-carbon smoke or smog particles which are suspended in the gas stream are included in the measurement. Accordingly, finely divided solids may be either included by permitting them to remain in the gas stream analyzed or may be excluded by collecting them in a fine porous filter which will remove such solid components.

Care must be used in operating the present instrument to avoid the accidental release of cigarette smoke or the products of combustion from striking matches because both of these common items release sufficient organic compounds containing carbon to hydrogen linkages into the air that if air containing such contaminants is introduced into the detector, spurious readings are obtained.

Because the atmosphere contains some methane, specially purified air or oxygen must be used, and very pure nitrogen and hydrogen for maximum sensitivity. Whereas for many purposes the background can be electrically cancelled, a minor variation in the background could be larger than the desired signal. In the usual chemical laboratory, traces of solvents, or small leaks, or a worker at an adjacent desk or in an adjacent room using a solvent, can drive the instrument off scale if ambient air is permitted to contact the flame.

The instrument may be used to analyze ethanol in the breath, blood or urine of suspected drunken drivers or others. Columns may be used to differentiate between alcohol and acetone or other hydrogen-carbon components, and measure the acetone concentration of a diabetic suspect, whether drunk or sober.

Similarly, the instrument may be used for exploration for oil and gas by measuring the concentrations of hydrocarbons in a particular area and by plotting the concentrations in an area from the air above the ground or from air drawn from beneath the surface of the ground. The areas in which a higher hydrocarbon content occurs can be located and such areas are in general indicative of the presence of petroleum deposits beneath the surface. Of course, allowance must be made for the spillage of petroleum products on the surface by trespassers.

In the distribution of gas, either natural or artificial, certain carbon-hydrogen compounds are present. Methane and ethane for instance are particularly common constituents of natural gas. By measuring the methane and ethane content of the air above a gas pipeline, small leaks in the gas line can be detected. Methane may be present from swamp gas or sewer gas or organic decomposition. Hence the ethane concentration is more reliable in oil and gas exploration and leak detection.

Similarly, in chemical plants and oil refineries where various plant streams are being used the total carbon-hydrogen content of the stream can be measured. The device may be used for detecting toxic gases, for instance, hydrogen cyanide has a carbon-hydrogen bond and activates the meter. Other uses include measuring the vapor pressure of hydrocarbons or determining the carbon-hydrogen constituents in volatile compositions directly or indirectly. A direct measurement of carbon-hydrogen components in liquid oxygen is important in missile works. The determination of traces of acetylene in oxygen or air has been a problem in liquid oxygen plants, in that the input air is often contaminated with trace amounts of hydrocarbons. The acetylene floats as a solid on the top of the liquid oxygen while the remaining hydrocarbons, being soluble in oxygen, are removed. Positive-type infrared analyzers have been used in this application, but a flame ionization detector is considerably more sensitive. With a second stage of amplification, a sensitivity of 10 p.p.b. is obtained. A flame ionization detector can determine total hydrocarbons or, in combination with a chromatographic column, the various hydrocarbons such as methane, ethane, ethylene, and acetylene can be separated and determined.

The present device may be used indirectly to measure moisture content by passing a gas stream through the instrument measuring the total hydrocarbon content, then passing the same gas stream through a calcium carbide cell, and measuring the additional acetylene present from the reaction of moisture with calcium carbide. A Grignard system can be used to release a hydrogen-carbon compound by reaction with water.

The change in composition of such a nature is particularly easily measured by using a bridge system in which the stream before reaction with calcium carbide is used in one leg of the bridge and after passing through calcium carbide in the other and using the signals to oppose each other thus the difference signal is a function of the acetylene produced from the water vapor in the stream.

Chromatographic systems may be used at the head of the detector to alter the composition to remove components in a predictable order, or release the components in a predictable order so that each may be measured separately, or by otherwise modifying the gas stream. Similarly, either heat or cooling may be used to selectively remove constituents from the stream prior to measurement.

Among such uses would be included checking solvent concentrations in a chemical laboratory, a manufacturing plant, or a hospital, particularly the operating room where ether may be present, or the concentrations of hydrogen-carbon containing gases in coal mines, tunnels, garages, or other areas where explosive levels or toxic levels may develop or in areas where fuels are handled, such as a petroleum refinery or aircraft operation, including aircraft carriers, etc. Paint factories and painters and others frequently breathe air which may contain trace quantities of hydrogen-carbon containing gases.

In addition to the safety or explosive question, gas streams in plants can be monitored to insure that either hydrocarbons are absent as in liquid oxygen plants or that any of the gases in a chemical plant or refinery are within desired control limits. It is possible to even check such small volumes as the contents of a package to be certain that the solvents used in the paint of the label or as an adhesive is not present in a quantity which can undesirably affect the taste, odor, or utility of the package contents.

Not only can the useful gases be analyzed in such plants, but waste gases ranging from the exhaust or internal combustion gases to the off gases in a petroleum refinery, or brazing atmosphere, or refrigeration leakage can be checked for halogenated hydrocarbons, etc. Where desired, the gases may be run through a chromatographic column to separate the gases or without a column the flame ion detector can be used to measure the total concentration. Scrubbers can be used to remove special classes of gases. It is convenient to use a chromatographic column containing glycerine for example to separate aromatic and non-aromatic gases. The columns can contain polar and non-polar solvents or any other class of solvent to give a preferred type of separation and the column may be subjected to a temperature program to accelerate certain classes of compounds as, for example, a single column can be used to analyze a wide variety of petroleum components by starting with the column at below room temperature or at room temperature to concentrate methane and then subjecting the column to a constantly rising temperature so that the less volatile hydrocarbons may be passed through in a reasonable length of time. The use of temperature programs to compact the trailing end of chromatographic analyses is becoming of more importance with the development of small columns whose heat capacity is such that temperature programming becomes practical.

The read-out device for indicating concentrations may be linear as, for example, in chemical analysis work or it may be changed to logarithmic so that a reasonable length of scale can cover an extremely wide concentration range as would be particularly suitable for determining the hydrogen-carbon or halogen-carbon vapor content of recirculated atmospheres such as in a fallout shelter, a submarine, or a space capsule.

Hydrocarbon classes can be determined by using selective scrubbers to remove the desired compounds. The unsaturated hydrocarbon content of exhaust gases has been determined by this method. An analysis is first made of the total hydrocarbon content. A second analysis is then made by passing a portion of gas through a $HgSO_4 + H_2SO_4$ scrubber which removes the unsaturates leaving only the saturated hydrocarbons. The unsaturated hydrocarbon content is calculated from the difference. Since the analysis is made by subtracting two high percentages, the detectable limit is reduced to $\pm 2\%$ of the total hydrocarbon content.

For dynamic sampling, two flame analyzers are used; one to measure the total hydrocarbons and a second to measure the saturated hydrocarbons. The unsaturate concentration being the difference.

A dual flame unit is used for the direct determination of unsaturate concentration. The ionization currents from the two flame burners are electrically opposed. To one flame is fed the total hydrocarbon sample and to the other flame is fed the scrubbed sample. The signal output is a direct measurement of the unsaturated hydrocarbons. A linear calibration curve is obtained with the flame detector for hydrocarbon concentrations up to 2% carbon, thus the flow rate to each flame can be adjusted so that the signal output for saturated hydrocarbons is zero. The scrubbing agent may be either a solution or may be impregnated on a porous insert solid absorbent. In either case, an equal volume of inactive material is placed in the flow stream to the second flame. In order to keep the dead volume small, the scrubbing agents are usually impregnated on diatomaceous earth. Since the hydrocarbon signal is eliminated and the analysis made from zero, the difference signal may be amplified to measure low concentrations. Lower concentration of unsaturated hydrocarbons can be measured with the dual detector.

In the past, vapor phase chromatography has been limited by the detector used in determining the composition or change in composition of the effluent gas stream. One of the methods which has been used for a long time is based upon the change in thermal conductivity with the change in composition of a gas. Others have been based upon the influence of radiation of the effluent gas or the change in the heat of the flame when a portion of the carrier gas is burned with a constant stream of a flame supporting gas such as hydrogen.

More recently it has been found that a hydrogen flame could have added thereto the effluent from a chromatographic column, after which the hydrogen is burned and the conductivity measured of the gas flame.

It has now been found that by using a concentric jet in which the inner jet is hydrogen and the outer jet is an oxygen containing gas, such as oxygen or air, the sample may be burned by adding to either the hydrogen or oxygen containing stream, the gas containing the products to be measured. The conductivity of the products of combustion are an indication of the hydrogen-carbon content of the sample.

A concentric jet permits mixing the hydrogen and the oxygen containing stream at a later time, to avoid explosion hazards of mixing oxygen and hydrogen before combustion, also the concentric jet permits easier control of the oxidizing gas than if the ambient air is used to support combustion. Air has a hydrogen-carbon concentration above the threshold of sensitivity of the instrument.

The dead space is also minimized so that faster response time is obtained.

For less exacting conditions, a single hydrogen jet gives good results.

In view of the fact that the electrical conductivity of the flame is comparatively low, an extremely high impedance circuit is used for measuring; particularly at low concentrations.

Amazingly the conductivity is found to be a straight line function from less than 5 parts per billon of hydrocarbon expressed as methane to about 5% and with some change in curvature the calibration curve is found to give effective measurable results up to at least 40% methane in a carrier gas. This is a most remarkable sensitivity range.

Particularly at the low concentrations of hydrogen-carbon or halogen-carbon a well-shielded, sensitive measuring device is necessary. At higher concentrations the sensitivity need not be so great. For high impedance measurements well-shielded leads are used to protect the instrument from stray electrical fields. Similarly, inasmuch as the grid resistor is preferably of the order of magnitude of $10^5$ to $10^{12}$ ohms, it can be seen that all portions subjected to potential are necessarily of an extremely resistant material in order that leakage currents do not interfere with measurements.

Without being limited to the specific details set forth in the preferred examples, but instead being limited by the invention as expressed in the appended claims, the following figures and examples are given as illustrative of certain embodiments of the new apparatus and its use.

FIGURE 1 is a cross-section view of the combustion apparatus and a wiring diagram of the electrical circuit.

FIGURE 8 shows diagrammatically a double multiple chromatographic or absorption column system feeding a bridge-type flame ion detector.

In the construction of the present ionization detector it is necessary to use the fastidious techniques required for extremely high impedance circuits. Leakage resistances of greater than a million million ohms ($10^{12}$ ohms) can cause erroneous readings at the higher resistance measurements used for the greater sensitivities.

COMBUSTION CHAMBER

Figure 2:
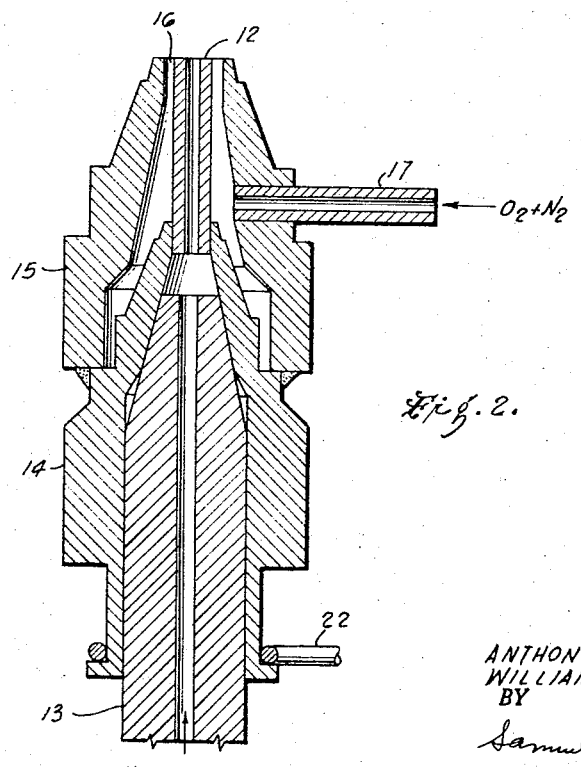
FIGURE 2 is a cross-section of the concentric jet assembly.

The burner chamber base 11 is constructed of a plastic with an extremely high insulating value. Preferably it is a polytetrafluoroethylene although a metallic base using insulating sleeves such as glass sleeves may be used. Through this base extends the wiring circuits and the gas flow tubes. As shown in FIGURE 2, representing a preferred embodiment, the inner jet 12 is mounted on a fuel jet support 13. While other materials of construction may be used, a stainless steel hypodermic needle of about 22 gauge makes an excellent inner jet. The inner needle hub 14 is mounted on the fuel jet support 13 which is a piece of glass or brass tubing of a size to fit the hub of the inner needle, which in turn is mounted in the burner chamber base 11. It is preferred that the fuel jet support extend only part way into the burner chamber base so that the insulating characteristics of the burner chamber base separate the complete burner assembly from the gas supply lines electrically.

Concentrically mounted on the inner jet is the outer jet 15. Conveniently but not necessarily the outer jet is a hub of a hypodermic needle concentrically mounted on the hub of the inner needle and soldered or brazed thereto. Silver soldering is preferred. Preferably the size of the outer jet is such that the concentric oxidizer orifice 16 has an area of at least as great as the gas flow area of the inner jet 12 but not more than 3 or 4 times that area. Into the outer jet feeds the oxidizer gas line 17. This is preferably metal also silver soldered into the outer jet. An oxidizer gas line elbow 18 as shown in FIGURE 1 connects to the oxidizer flow port 19 in the burner chamber base. The oxidizer flow port 19 and the hydrogen flow port 20 in the burner chamber base are preferably comparatively small holes extending through the burner chamber base which are counterbored at the upper and lower end. The counterbores at the upper end receive the fuel jet support and the oxidizer gas line elbow against the shoulders 21 of the counterbored port. By having a counterbore and a comparatively small gas flow port in each line there is no danger of insetting the fuel jet support or the oxidizer gas line elbow too deeply into the burner chamber base and thereby introducing a high resistance short. The short length of small size in the oxidizer flow port and the hydrogen flow port each cut down on the dead gas space and insure extremely high insulating value. It is desirable that the dead gas space be kept to a minimum in order that changes in sample gas concentrations are reflected in the flow of gas through the concentric oxidizer jet and the inner jet as rapidly as possible, thereby increasing the speed of response of the instrument. It is preferred that both the inner jet and the outer jet be of stainless steel or other corrosion resistant metal. The tops of the two jets are preferably in the same plane. The jets may be ground at the same time, after assembly, against a grinding wheel, being careful to avoid the production of burrs. By having the jets of the same length the risk of the inner or outer jet becoming overheated by contact with the flame is minimized. If either the inner jet or the outer jet becomes overheated such jet may introduce extraneous ions into the flame and change the reading of the instrument. Either the inner or the outer jet may be of glass; but if of glass, the instrument is more fragile and ions released by the glass may give false readings. When constructed of metal, in the preferred embodiment, the risk of differences of potential at different places on the jet assembly is minimized, and the jet assembly is extremely rugged and mechanically stable.

To a metallic part of the jet assembly is attached a burner lead 22. This burner lead is an electrical conductor which passes through the burner chamber base to the electrical parts of the apparatus. Preferably the burner lead is a shielded lead which is well insulated. Polytetrafluoroethylene insulation is preferred. Other high resistance plastic may be used as insulation if care is used during assembly to avoid contact of the bare fingers with the insulation as many of the other plastics are more susceptible to fingerprints and the traces of contamination from a fingerprint across the insulation of a lead can form a high resistance short which leads to instability in the assembled device.

Also extending through the burner chamber base is a collector screen support 23. Conveniently this collector screen support is an insulated wire which furnishes both mechanical support to a collector screen 24 and serves as an electrical connection to the collector screen. The collector screen is preferably of a corrosion resistant metal such as platinum or nickel. The platinum or nickel is spot welded to the collector screen support at a point outside the flame above the jet. The collector screen may either be a coil of wire or a single wire or a woven screen or perforated screen which is placed above the jets in such a position that the combustion flame above the jets impinges directly upon the screen. Conveniently the screen extends beyond the flame in all directions. The portion extending beyond the flame act as heat radiators to keep the screen cool, to avoid secondary emission, and lengthen screen life. A screen about 1 centimeter in diameter of platinum makes a very satisfactory collector screen. The screen is located at a height of from about 2.5 to 15 millimeters above the jets. A height of 7.5 millimeters gives very good results. The screen height is not critical. Also extending through the burner chamber base are two ignitor leads 25 which extend to an ignitor coil 26 which is placed adjacent but not in the flame. The ignitor coil is preferably a resistance wire which is connected by the ignitor leads to a suitable power source, for example, an alternating current transformer, to cause the ignitor coil to glow red and ignite the hydrogen jet. A double pole ignitor switch 27 is provided to disconnect both leads of the ignitor coil from the current supply after the flame has been ignited. A spark gap ignitor may be used.

Closely fitting on the burner chamber base 11 is a burner shield 28. The burner shield is a metallic shield which fits closely on the burner chamber base and has a foraminous area 29 directly above the burner itself and which shield is grounded. The entire shield may be of wire mesh but conveniently a metallic foil such as an aluminum foil is used, the portion above the jet either being perforated or having a built-in screen.

For use where the air surrounding the instrument may be contaminated, it is preferred that the burner shield be of a metallic foil through which extends a flushing air line 30. A gentle current of pure flushing air is fed through this flushing air line to carry away the products of combustion and to insure that the air coming in contact with the burner from the outside is free from gases containing hydrogen-carbon or hydrogen-halogen compounds which might give an erroneous reading.

Unless the burner assembly is mounted on and extends into an electrical instrument box which is itself a shield, it is preferred that an additional shield extend around the bottom side of the burner chamber base. This bottom shield 31 has holes in it for the various leads into the burner chamber 32 formed by the burner chamber base and the burner shield 28. Shields on the collector screen support 23 and the burner lead 22 may be electrically connected to this burner bottom screen where they pass through the screen.

GAS FEED SYSTEM

Underneath the hydrogen flow port 20 is a hydrogen supply line 33. In the hydrogen supply line is a hydrogen flow meter 34, a hydrogen capillary flow orifice 35 and a hydrogen pressure gauge 36. Hydrogen is supplied from a suitable source such as a compressed hydrogen tank through a reduction valve to the pressure gauge at the high pressure end of the hydrogen capillary flow orifice. The hydrogen capillary flow orifice may conveniently be a piece of thermometer tubing or other tubing having such a small opening that pressure drop through the tubing is considerable and the flow a function of the hydrogen pressure on the orifice. The flow can be measured through a flowmeter and adjusted by changing the pressure at the pressure gauge to adjust the hydrogen flow to a desired rate.

A sample T 37 in the hydrogen flow line feeds a sample into the hydrogen and with the hydrogen into the jet.

The hydrogen conveniently has at least some nitrogen mixed with it to reduce the flame temperature. The amount of nitrogen mixed in with the hydrogen depends in part upon the amount of diluent gases supplied with the sample. If the sample is comparatively dilute, with a high proportion inert gases, pure hydrogen may be used but if the sample is more concentrated, pure hydrogen mixed with about 50% nitrogen is preferred.

Air or oxygen is supplied to the oxidizer jet. The air or oxygen is supplied from a pressure source through an oxygen capillary flow orifice 38. There is a pressure gauge 39 to measure supply line pressure which pressure is adjusted so that the rate of flow through the capillary is as desired. An oxidizer flow meter 40 measures the feed rate of the oxidizer gas. Pure oxygen may be used as the oxidizer, but preferably is mixed with at least some nitrogen to avoid too high a flame temperature. The air or oxygen supplied as the oxidizer is desirably comparatively free from hydrogen-carbon or hydrogen-halogen containing substituents in order that there is not an undue background or a false signal due to detectable materials introduced as contaminants with the oxidizer gas supply.

Some hydrogen-carbon substituents may be present in the supplied gases, and be subtracted out on the recording circuit by the zero level adjustment, if the concentration is constant. The more sensitive ranges require better control of background noise, to which such contaminants contribute. Commercially available pre-purified nitrogen and oxygen contain some hydrogen-carbon substituents frequently from 0.1 to 100 parts per million.

ELECTRICAL SYSTEM

The frame polarizing battery 41 is connected so that the burner jet is positive and the negative lead from the battery passes through a grid resistor 42 to the collector screen support 23 which is electrically connected to the collector screen 24. A grid resistor selector switch 43 is used to select a grid resistor of the proper value. The polarizing battery may have a value of from about 15 to 350 or more volts. The sensitivity increases rapidly as the voltage is increased to about 115 volts. Between about 115 and 340 volts the sensitivity is constant. A greater voltage is unnecessary. The value of the grid resistor may vary from about one hundred thousand ohms to one million million ohms ($10^5$ to $10^{12}$ ohms). As shown in the FIGURE 1 a good selection is to have resistor values selectable at will of $10^6$, $10^7$, $10^8$, $10^9$, $10^{10}$, and $10^{11}$ ohms. A grid resistor is selected which has a value which gives a good instrument reading with the hydrocarbon concentration in the sample stream.

The collector screen is connected to the grid 44 of a vacuum tube 45. The vacuum tube is necessarily a high impedance tube. Tubes which are used for electrometers are preferred. A tube such as tube type 5803 or Victoreen VX55 or CK5886 gives good results. Such a tube requires a plate voltage of 7½ to 15 volts, a control grid voltage of about $-1.7$ volts and requires a grid control current in the order of $2 \times 10^{-14}$ amperes. Such a tube may have an amplification factor ($m\mu$) of about 2.0 and a mutual transconductance (gm) of about 150 micromhos. Any standard very sensitive electrometer circuit may be used. At high concentrations an ordinary vacuum tube voltmeter can be used.

One, as shown consists of a filament battery 46 wired through a single-pole double-throw switch 47 to the filament 48 of the tube 45. In the cathode circuit of this tube are a cathode resistor 49 and a microammeter 50. Conveniently the cathode resistor 49 has half the resistance of the microammeter 50 and millivoltmeter recorder leads 51 lead to a millivoltmeter recorder 52 so that it may be connected in shunt across the microammeter or the cathode resistor or both to give a sensitivity of 1, 2, or 3. Typical values of the microammeter resistance and the cathode resistance are 2200 and 1100 ohms respectively. A 10 millivoltmeter recorder connectable at will across 1,100, 2,200, or 3,300 ohms as a cathode resistance gives good stable values. A shunt 53 leads around the microammeter and the cathode resistor and is connected to the second pole of the single-pole double-throw filament switch so that when the filament is disconnected from the battery and the instrument turned off, the microammeter is shunted through the cathode resistor. By so shunting the microammeter, the needle is damped and the meter is less sensitive to mechanical injury during handling.

A stabilizing resistor 54 shunts the filament battery to the cathode return. The negative end of the battery is conneced to the cathode lead and by having the stabilizing resistor 54 in series with the cathode resistor and the microammeter, as a shunt to the filament battery, a slight positive bias is introduced by this filament battery circuit to the cathode return and greater stability of calibration is thereby obtained. A value of about 15,000 ohms on the stabilizing resistor gives good results.

A plate battery 55 is connected through a plate current switch 56 to the plate 57 of the vacuum tube. The plate return is connected through the main cathode bias resistor 58 to the microammeter and through the microammeter and smaller cathode resistor 49 to the negative side of the filament. A value of about 50,000 ohms gives an adequate cathode bias. The plate battery and plate current switch are shunted by a plate shunt resistor 59 and a zero potentiometer 60.

For greatest sensitivity the entire polarizing battery circuit should be shielded by a shield 61, using shielded wires and an actual shield over the battery. Such shielding gives greatest sensitivity and stability.

As will be obvious to those skilled in electronic work, the shields may be omitted for lower sensitivity work, with a slight loss in stability. Similarly for convenience the plate current switch 56 and the filament switch 47 may be ganged.

The flame polarizing battery may have a switch in its circuit but in view of the extremely high impedances involved this battery has shelf life whether it is switched on or off, and the flange itself acts as a switch.

Sources of electrical potential other than a battery may obviously be used in the apparatus but in view of the extremely high stability required such other potential sources would be unduly bulky and for the very small current required batteries furnish the most economical and portable source of power. The entire assembly is very small, is convenient and may be made portable for use in measuring hydrocarbon substituents in various areas or may actually be airborne as by a balloon for measuring smog at various altitudes over a city, a suitable transmitting system being used to give an indication by radio of the indicator's readings.

Great care must be used in the grid circuit of the electrometer tube to avoid high resistance shorts. For example, the grid resistors are preferably sealed in glass, and the glass shields are carefully washed and then handled only by forceps during manipulation including soldering into the system. The grid resistor selector switch must be one which has an extremely high resistance and is preferably of ceramic or polytetrafluorethylene construction in order that the resistance through the switch will be of the same order of magnitude as in the rest of the equipment.

Although sample introduction is shown into the hydrogen jet, the sample may be introduced with the air or oxygen jet. A sample introduction with the oxidizer gives results which are excellent, although results obtained when introducing the hydrocarbon with the hydrogen are preferred. Usable results are obtained at lower sensitivity even if the leads and potential to the flame is reversed. Greater sensitivity is obtained when the flame jet itself is the positive pole.

BRIDGE CIRCUITS

Figure 3:
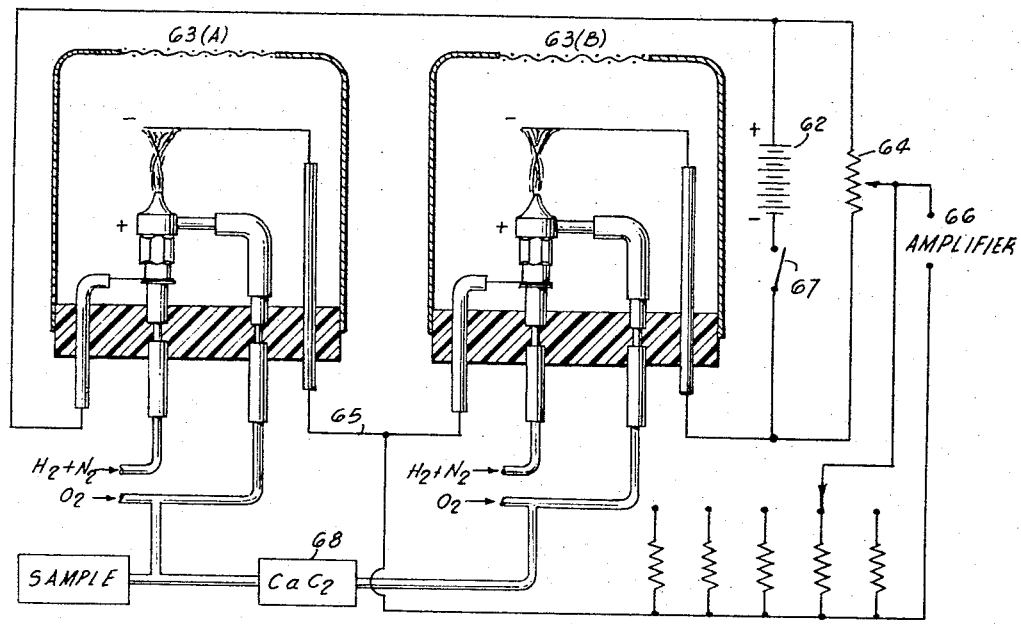
FIGURE 3 is a wiring diagram and diagrammatic sketch of a bridge detector system showing a delay line and a calcium carbide unit for water detection.

As shown in FIGURE 3 two of the flame ion detectors may be connected in a bridge circuit. Whereas, other bridges may be used, one satisfactory circuit involves connecting two of the jets and collector streams in series. As shown in FIGURE 3, a flame polarizing battery 62 is connected across two flame ion detectors 63 A and B, with the jets and screens arranged in series. The high resistance potentiometer 64 is connected across the flame polarizing battery 62 bridging the flame ion detectors. To the mid point of the potentiometer 64 and the central jet-screen connector 65 is connected an amplifier 66. A battery switch 67 provides for disconnecting the flame polarizing battery.

A mixture of hydrogen and nitrogen is supplied as a fuel and diluent and oxygen is supplied as an oxidizer, the same supply system being used to supply equal quantities of these gases to each of the flame ion detectors A and B. The sample is supplied and injected into the oxidizer supply of detector A directly; and through a calcium carbide cell 68 and then into the oxidizer supply of detector B. The sample may be supplied from any suitable source. The first detector gives an immediate reading of the hydrocarbon content of the sample stream. The second one gives a delayed reading due to the time required to go through the calcium carbide cell. If a dry sample is supplied the delay in passing through the calcium carbide cell and the longer supply line causes the detector B to give a somewhat later reading. Therefore the difference between the reading of A and B as measured on the bridge circuit is indicated by the amplifier as the rate of change of hydrogen-carbon components in the sample stream. If the sample stream is constant and contains moisture the calcium carbide reacts with the moisture to deliver acetylene and the additional concentration of the acetylene is measured on the amplifier.

Obviously, a simple delay line may be used instead of the calcium carbide cell to give a reading of rate of change of the hydrogen-carbon components or an equivalent delay line may be introduced into the supply line of detector A so that the bridge is sensitive to only moisture content as the time of injection of the sample is adjusted to be equal. Other modifications of the bridge circuit may be used for other purposes which may be desired using the ideas embodied above.

EXHAUST GAS AND SMOG ANALYSIS

Figure 6:
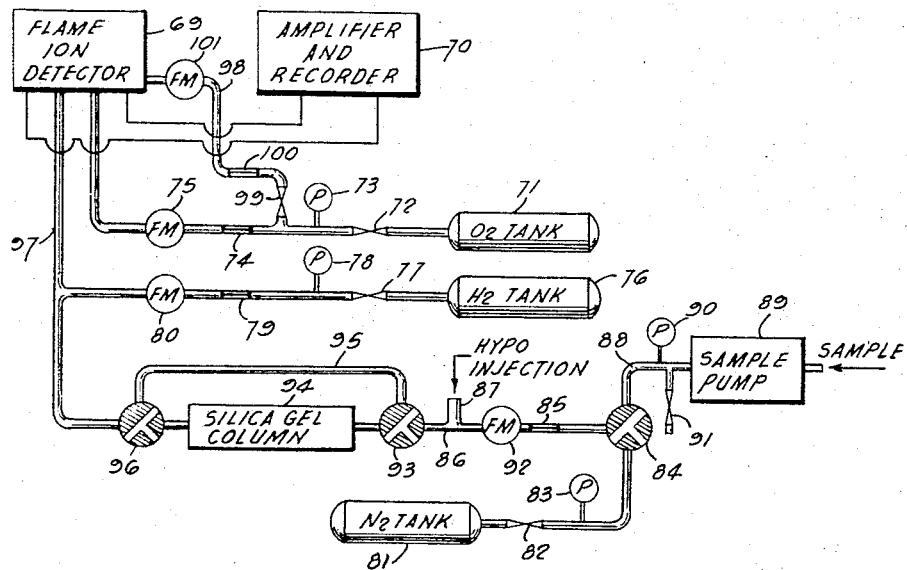
FIGURE 6 is a diagrammatic view of a portable self-contained form of the invention, which is particularly adapted to be used as an exhaust gas and smog analyzer.

FIGURE 6 shows an embodiment of the present flame detector particularly suitable for analysis of exhaust gases from combustion engines such as automobiles and for analysis of smog producing constituents in the atmosphere. In this embodiment the flame detector chamber itself 69 which may be as shown in FIGURE 1 is connected to an amplifier and recorder 70. The circuit shown in FIGURE 1 may be used or the microammeter alone may be used as a readout device. The oxidizer source used is pure oxygen or air from an oxidizer supply tank 71 which is under high pressure. The oxygen or air passes through the oxidizer control valve 72, past an oxidizer pressure gauge 73 through an oxidizer flow control capillary 74 and an oxidizer flow meter 75 to the flame ion detector.

Hydrogen is supplied from a hydrogen pressure tank 76 through a hydrogen control valve 77 past a hydrogen pressure gauge 78 through a hydrogen flow control capillary 79 through a hydrogen flow meter 80 to the burner jet of the flame ion detector.

Nitrogen under pressure is supplied from a nitrogen supply tank 81 through a nitrogen control valve 82 past a nitrogen pressure gauge 83.

The nitrogen is passed through a stream selector T-valve 84. The output system from this stream selector T-valve passes through a sample stream flow control capillary 85 to a manifold 86. A sample flow meter 92 is inserted before the manifold to show the flow rate of the stream.

Also connected to the manifold is a sample port 87. Conveniently, this is a T-joint into the manifold with a rubber closure, such as is used for injectible drugs, and which has a rubber member designed to be punctured by a hypodermic needle. Samples of gases can be injected from a hypodermic syringe by running the needle through the sample port 87 into the manifold and injecting the gas into the flowing nitrogen.

Also connected to the other arm of the stream selector T-valve 84 is a continuous sample flow line 88. A sample pump 89 supplies a continuous sample stream, from any source, past a sample pressure gauge 90 to the continuous sample flow line 88. A bleed valve 91 is provided to release surplus gas to control pressure. The sample stream flow rate is controlled so that either the flow rate of a carrier nitrogen stream, or from a sample pump is a desired value.

The metered flow passing from the manifold 86 passes to a selector T-valve 93, which passes the sample stream selectively through a silica gel column 94 or a by-pass 95 to an output T-valve 96, which feeds the sample stream into the hydrogen flow by a connector 97. The two T-valves 93 and 96 are operated so that a sample is selectively passed either directly through the by-pass 95, or through the silica gel chromatographic column 94 to the hydrogen stream to the flame ion detector.

A stream sample, for continuous analysis, or a single shot sample, fed by a hypodermic syringe to the nitrogen stream, may thus be either analyzed directly for total hydrogen-carbon compounds, or passed through a chromatographic column, so that individual components may be measured independently.

This embodiment is particularly convenient for portable use as the oxygen, hydrogen and nitrogen tanks may be small laboratory size tanks, the sample pump may be a hand operated pump and the entire device is portable and may be easily carried from place to place. The entire device may be carried by a balloon for measuring contaminants at any desired atmospheric level.

An oxidizer by-pass 98 may be provided to pass part of the air or oxygen from the oxidizer supply tank 71 past a secondary air valve 99 through a secondary air capillary 100, through a secondary air flow meter 101 to the combustion chamber of the flame ion detector. For use where the ambient air is low in hydrogen-carbon compounds, a simple ventilating port may be used, but controlled surrounding conditions for the burner jet are preferred for high sensitivity measurements, as the impurities in the surrounding air also give a response. Side vents in the outer jet may be used as bleed ports to supply a controlled secondary air, but an independent supply line gives better flow control. Similarly the gas control valves may be simple needle valves, but pressure regulator valves are easier to manipulate for accurate control of the flow of the various gas streams.

USE OF ANALYZER

The analyzer shown in FIGURE 6 may be used for measuring very low concentrations of hydrocarbons. Conveniently, a sample from either the exhaust of an automobile or from air which is suspected of being contaminated is passed through the sample pump, mixed with the hydrogen, fed to the flame jet, and burned in the oxygen from the oxygen or air tank. The ratio of hydrogen flow in milliliters per minute to total gas flow in milliliters per minute should be below 0.58.

The response varies with the ratio of hydrogen to the diluting gases. A ratio of hydrogen to inert gas, plus oxidizer, of about 0.85 to 0.9, on a volume basis, gives the least variation of signal with a slight change in gas flow rates. A fairly flat plateau exists between a ratio of 0.7 to 1.2. Values outside these ratios give reproducible results but the instrument is less stable. Obviously helium or other inert gas may be used as the diluent.

An excess of oxygen is normally supplied.

The hydrogen flow rate for a 22 gauge needle jet may be from 15 to 50 milliliters per minute, and 25 to 35 gives preferred results. The ratio of hydrogen to other gases is more important than the absolute flow rate.

The gases are well mixed in the flame, so that the sample can be injected into either the hydrogen or the oxidizer jet. At least part of the oxygen may be mixed in the hydrogen jet. Such operation is convenient when part of the sample stream is oxygen. Flame instability results from too high a flow rate in the jets or too high a dilution of the hydrogen with inert gas and increases background noise.

Figure 7:
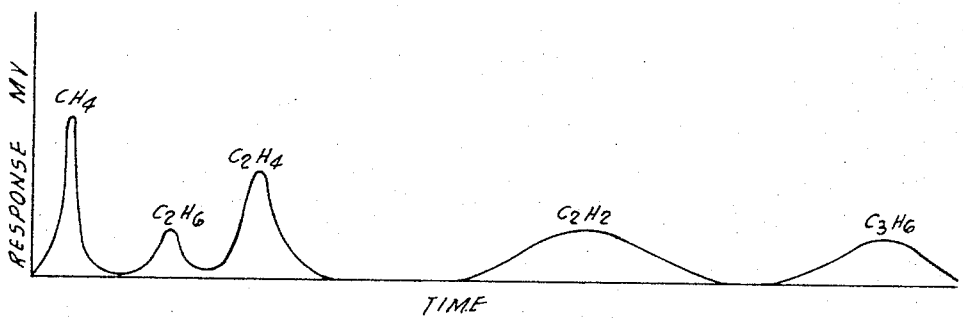
FIGURE 7 is a chromatogram of a typical gasoline engine exhaust gas through this analyzer.

If a reading of a particular sample is desired, the sample is run through the sample pump, directly through the by-pass, mixed with the hydrogen, and burned in the jet and the potential measured. The flame ion detector is calibrated against known samples of approximately the same constitution under the same conditions. The response is proportionate to the number of carbons having carbon to hydrogen linkages or carbons having carbon to halogen linkages. Note Table 1. The exhaust gas of an automobile or the atmospheric air may be measured for "smog" in this fashion. If it is desired to determine what are the constituents of "smog," atmosphere, or exhaust gas, the T-valves 93 and 96 are turned to pass the sample through the silica gel column, a selected sample is injected by a hypodermic syringe, passed through the silica gel column and into the nitrogen stream. The gas then passes through the silica gel column, and develops the absorbed hydrocarbon constituents. Methane itself passes almost directly through the column while the higher hydrocarbons pass through more slowly. A typical analysis is shown in FIGURE 7 in which the first peak is methane, the second one ethane, the third ethylene, the fourth acetylene and the fifth propylene. A silica gel column a quarter of an inch in diameter and 8 inches long gives good development. The silica gel column may be heated to insure the volatilization of higher hydrocarbons, or the column may be longer or shorter depending upon the discrimination desired between sample constituents. In each instance a flow of oxygen, hydrogen and nitrogen is maintained constant by use of the appropriate control valve to control the pressure of the gas forcing the gas through the flow control capilary and the flow meter.

The present device is sufficiently sensitive to measure impurities in ordinary city air. For example, the methane content in a laboratory building was found to be about 3 parts per million.

Typical values of hydrogen-carbon constitutents in city air, in New York City was found to be 7.6 parts per million, calculated as volumes of methane per volume of air. Of this 2.2 parts per million were methane; 0.08 part per million of ethane (0.16 methane equivalent); 0.11 part per million pentane, and 0.13 part per million hexane.

In Stamford, Conn., in a country area, a value of 1.4 parts per million, reported as methane was obtained.

The area under the curve in the effluent from a chromatographic column is a measure of the amount of the particular constituent present in the sample. Either a continuous analysis or a selected sample analysis may be made. If a continuous analysis is used the signal response is a measure of a concentration of the sample gases containing carbon-hydrogen or carbon-halogen linkages.

In each instance the device is calibrated against known samples. The rates of gas flow and the exact physical configuration and sensitivity of the circuits is such that the sensitivity cannot be theoretically determined. However, known samples are run through the burner and a calibration curve established which remains constant for the particular instrument and flow rates being used.

Figure 4:
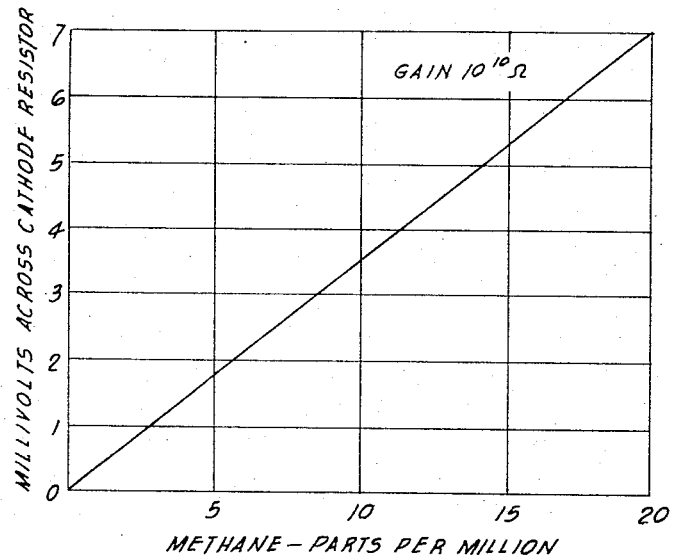
FIGURE 4 is a graph showing the millivolts across the cathode resistor against methane in parts per million for a grid circuit resistance of $10^{10}$ ohms.

FIGURE 4 shows a response expressed in millivolts across a cathode resistor of 1,100 ohms against the methane content in parts per million of a sample gas (air) being introduced in the device of approximately 35 milliliters per minute in the outer jet and a hydrogen flow of 30 milliliters per minute through the inner jet. A grid resistance of $10^{10}$ ohms was selected.

Approximately the same calibration curve is obtained if the sample gas, in this case air containing methane, is mixed with the hydrogen and fed to the single inner jet, and the outer jet is not used.

Figure 5:
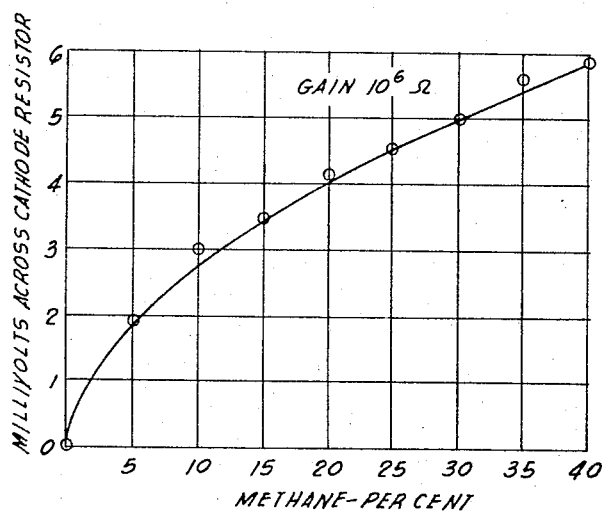
FIGURE 5 is a low sensitivity graph showing the millivolts across the cathode resistor with a resistance in the grid circuit of $10^6$ ohms against methane concentration in percent.

The same instrument at a much higher methane content gave the response shown in FIGURE 5 in which the sensitivity is diminished by using a $10^6$ ohm resistor in the grid circuit of the tube. At the lower concentrations the response is seen to be linear with concentrations. At concentrations above about 1% of methane, the curve no longer is linear but is reproducible up to values of at least 40% methane. More concentrated gases can be diluted.

Gases other than methane are used for calibration for the measurement of the concentration of such other gases. If a constant rate is to be used for a flow sample, the response is proportional to the total number of carbons containing hydrogen linked thereto, plus the value of those containing carbon with halogen linked thereto. The hydrogen-halogen calibration constant is slightly smaller; separate calibration is required for the halogen components. For straight hydrocarbons the responses thus are twice as great per mol for ethane as for methane, three times as much for propane and so on proportionally upward. Obviously, the vapor pressure of the sample gases must be such that they will remain in their vapor form and not condense out as liquids in the apparatus. If higher concentrations of higher hydrocarbons are used the entire apparatus may be warmed in a suitable oven to a temperature sufficiently high to keep the sample in the vapor form. Calibration on methane alone gives values which are satisfactory for determination of the contents of gases containing hydrocarbon linkages. Where a chromatographic column is used to differentiate between gases, a calibration sample may be used to determine where each sample comes off of a column and to synthesize a sample approximately that of the unknown sample to check and be sure that all of the peaks are as anticipated. With the more complicated samples which are found in smog, at times certain of the constitutents overlap on the column and are difficult to separate. Longer columns can solve this difficulty.

DIFFERENTIAL ANALYSIS

The apparatus shown in FIGURE 3 is used for determining concentration gradients. Even if the air in the laboratory is contaminated or even if the source of oxygen has a certain amount of hydrocarbon vapors in it, still accurate readings may be obtained using the bridge circuit. Using the bridge shown in FIGURE 3 a delay line may be used and the apparatus carried along the ground. For pipe line leaks a short delay of about 5 seconds is useful, as the concentration gradients are sharp. For oil and gas exploration a delay of at least 2 minutes is useful, or an absolute concentration plot may be used. The variations in hydrocarbon content of the ambient air as it comes from very close to the ground can be plotted to give a measurement of the likelihood of underground deposits containing gases being found. Similarly, samples of air passed through water samples from various locations in a body of water are analyzed to give hydrocarbon content of the water, as an indication of underwater oil and gas deposits. Ethane is a more reliable indicator than methane, as marsh gas contains methane. Similarly, a delay line may be used to show the variation in hydrocarbon content as motor vehicles pass a given point or as the instrument is carried away from a highway serving as a source of contamination.

The same instrument may be used with the calcium carbide tube in place to determine the moisture content. Inasmuch as a calcium carbide reacts with water, concentrations of water in gases can be measured at extremely low concentrations. The calcium carbide should be fresh so that an earlier history of moisture contamination does not disturb the accuracy of the apparatus.

Using the apparatus of FIGURE 3, 30 milliliters per minute of hydrogen is fed to each inner jet. 15 milliliters per minute of oxygen is fed to each concentric oxidizer jet. A sample of 20 milliliters per minute of air is also introduced in the outer stream.

The signal in the first ion detector is a measure of hydrogen-carbon concentration, and may be measured if desired. The additional signal from the second jet, as shown on the bridge indicates additional hydrogen-carbon, as acetylene from the reaction of calcium carbide with moisture in the air. A moisture content of room air of 1.5% is found on a typical day. The moisture can be measured even in very dry streams from drying equipment, when values of 0.1 part per million can be measured.

In order to test for ethyl alcohol in human breath, blood or urine, a chromatographic column is desired in order to discriminate between ethanol, acetone, hydrocarbons or other organic material. A 20% polyglycol on 70 to 100 mesh diatomaceous earth chromatographic column, ¼" diameter and 6 inches long, at room temperature permits detection of both acetone and ethanol. The sample is taken by blowing breath into a clean glass syringe, or bottle. The sample is then injected into the column as shown in FIGURE 6, except for the column filling. Acetone is eluted in 45 seconds and ethanol is eluted in three minutes. With the sensitivity and selectivity of the analyzer, it is possible to measure the alcohol content in the breath 2 hours after drinking one ounce of liquor. It is also possible to distinguish a diabetic coma from alcoholism in a patient by measuring the acetone. Using a single jet, burning in filtered room air, a hydrogen flow rate of 25 milliliters per minute and a nitrogen flow rate of 35 milliliters per minute, and the above mentioned 6 inch polyglycol on diatomaceous earth column, with a 5 milliliter sample, using a $10^{10}$ ohm grid resistor and a calibrated scale, the results showed an alcohol content of off scale at 3 minutes, 2.5 millivolts equal to 10 parts per million of ethanol in air at 16 minutes; 0.95 millivolt, equal to 3.7 parts per million after 20 minutes, and 0.4 millivolt, equal to 1.5 parts per million after 33 minutes. The column showed an acetone content of 0.5 part per million in the breath of the subject.

The difference in effect between ethanol in the blood stream and ethanol in the mouth only is shown by a test in which the mouth of a subject was rinsed with 10 cc. of 100 proof ethanol, the mouth rinsed with water, and then the breath from the mouth sampled. The results were:

| Time, minutes: | Concentration ethanol, p.p.m. |
|---|---|
| 2 | 75 |
| 10 | 10 |
| 18 | 0.5 |

In a second experiment the same subject drank 10 cc. of 100 proof ethanol. The mouth was not rinsed with water. The breath from the mouth was found to contain:

| Time, minutes: | Concentration, p.p.m. |
|---|---|
| 2 | 300 |
| 11 | 15 |
| 30 | 2.5 |
| 45 | 1.2 |
| 75 | 0.5 |

In a third experiment with the same subject 30 cc. of the same 100 proof ethanol was ingested and the concentrations were found to be:

| Time, minutes: | Concentration, p.p.m. |
|---|---|
| 0 | 1000 |
| 5 | 500 |
| 8 | 125 |
| 13 | 60 |
| 94 | 2.5 |
| 200 | 0.75 |

If the same tests are run using a good grade of bourbon whisky, methanol can be detected in the breath. Good bourbon contains in the order of 200–300 parts per million of methanol. This is sufficient for a distinct methanol peak to be located in the chromatogram run from the breath of a subject drinking the bourbon.

The acetone concentration of the subject's breath remained at about 0.5 p.p.m. throughout.

Cigarette smoke contains methanol, ethanol, acetone, and many other compounds. The detection of ethanol from other sources can be partially obscured by these peaks if the subject is smoking.

The resolution of peaks can be increased by longer columns, and greater sensitivity, so that volatile compounds can be separated by the use of selective columns, but for the usual tests of intoxication, the subject is held without eating, smoking, or drinking liquids for 20 minutes, and a low resolution column is effective, economical, rapid and unequivocal.

The present detector with a short polyglycol column is particularly useful in receiving rooms of hospitals. A rapid check can be made for ethanol, acetone, gasoline, and various solvents, to distinguish diabetics, drunks, and poisoning victims, as from carbon tetrachloride, benzene, cleaning fluid, lighter fluid, methanol, etc.

Importantly, subjects which have two or more constituents, as for example, an intoxicated diabetic; or an intoxicated subject who has ingested methanol or gasoline; or alcohol in the presence of onions, garlic, lemon extract, peppermint oil, or other odors designed to disguise, can have all constituents identified.

The hospital can also determine ether concentrations, both from the standpoint of depth of anesthetic, and recovery rate, to check on departures from normal, after an operation; and explosion hazards.

The use of the flame ion detector in explosion hazards permits checking of leaks long before a dangerous atmosphere is built up. Flameproof shields can be used around the detector if operation in hazardous areas is contemplated. The use of ether as an industrial solvent is discouraged because of its flammability. With better methods of leak detection, its industrial use becomes more practical.

Odors and other air pollution can be readily determined, and because of great sensitivity, sources may be more readily traced.

Water pollution is determined by passing air through a water sample and testing the air in the flame ion detector. A sample of 10 microliters to 50 microliters of water can be injected, directly, and the water vapor passes along with the carrier gas, and is not seen in the flame ion detector. If larger quantities of a water sample are needed, the apparatus, including the columns, is heated to keep the water in the vapor phase. Because the flame ion detector is blind to water vapor, this method is particularly useful, as traces of contaminants are located even in the presence of large quantities of water vapor and/or carbon dioxide. Methane, ethane, alcohols, acetone, etc. may be detected in the presence of each other.

The exhaust gas of a gasoline engine can be analyzed not only from the standpoint of air pollution, but also to determine combustion efficiency. The exhaust from each cylinder can be independently analyzed to determine if the carburetion efficiency is equal in each cylinder, etc.

For highest accuracy, the hydrogen, nitrogen, and combustion air should be carefully freed from traces of hydrocarbons. A two-stage or multi-stage amplifier, and high resistance components in switches, and wiring is required for maximum sensitivity. Around a hospital, background levels of solvents may be so high that a carefully balanced bridge is needed to balance out ambient hydrogen-carbon vapors. A comparison of inspired air and expired air samples can be used if the background level is high. Care must be used to be sure that ambient air currents do not change the background levels during sampling.

In the diagnosis of diabetics, acetone is found in the blood, urine and breath of the patient. Insulin is normally used to control the sugar level. Analyses were made on several patients under insulin and the acetone concentrations were found to be about 0.25 p.p.m. Normal concentration levels were found to vary from 0.10 to 0.50 p.p.m. acetone. One patient who was believed to be in a diabetic coma and had been placed on insulin for several hours was found to have about 50 p.p.m. acetone in his breath. (This concentration was lower than expected because the patient was hyperventilating and unconscious at the time the sample was taken.)

With the use of this rapid analytical technique it is possible to measure and differentiate many states of diabetic treatment and to observe the condition of the patient.

Urine, blood and breath samples were analyzed from a diabetic who had been placed on insulin treatment. The acetone content of the urine and blood were found to be about 0.2 gram of acetone per liter, by passing air over the sample, permitting equilibrium conditions to be reached, and measuring the acetone concentration of the air, and calculating back. Another technique is to inject 10 microliters of blood or urine directly into the system, and permit solids to drop out on the tubing walls. The breath sample was found to contain about 1,000 p.p.m. acetone. High acetone concentrations are indicative of diabetes.

In FIGURE 8 is shown diagrammatically a versatile bridge analyzer for separately analyzing various components of mixtures either separately or by difference and which is adaptable to use with various chromatographic columns or scrubbing columns to separate a sample gas into selected fractions. Without unduly repeating the description above in connection with other modifications, the modification shown in FIGURE 8 has air supplied through an air reduction valve 102, a control valve 103, to an air T 104, where the flow is split and one portion passed through a needle valve 105, through an air flow meter 106, and an air flow capillary 107, into a flame chamber 108. Hydrogen is passed through a hydrogen reduction valve 109, a hydrogen control valve 110, to a hydrogen T 111, where the hydrogen is split into two streams, one of which passes through a hydrogen needle valve 112, a hydrogen flow meter 113, and a hydrogen flow capillary 114, to a mixing manifold 115.

A carrier gas, conveniently nitrogen, is passed through a nitrogen reduction valve 116 and a nitrogen control valve 117, through a nitrogen flow meter 118, to a nitrogen reservoir 119, which is conveniently a long piece of coiled tubing, as for example, 12 feet of ¼" OD copper tubing. Connected through a T, at the front end of the tubing is a bubbler 120, conveniently an arm of glass passing into a glass cylinder partially filled with water which thus limits the pressure of nitrogen. The nitrogen under constant pressure from the nitrogen reservoir 119 flows past a continuous analysis sample port 121 controlled by a sample valve 122 and past an injector septum T 123, which is conveniently a rubber dam puncturable by a hypodermic needle of the type used in closing pharmaceutical vials to a sample T 124, past a nitrogen and sample needle valve 149, and a nitrogen and sample flow meter, through a sample flow capillary to a sample manifold 126. Between the sample manifold 126 and the mixing manifold 115 extends a plurality of chromatographic columns or absorbent columns 127. These columns have a valve 128 at each end and are interchangeable. Ground glass or inert plastic connectors are used. The substrate on the columns is selected for a particular analysis being conducted; the details of which are later referred to. The carrier gas and the sample are mixed with hydrogen in the mixing manifold 115 and flow through a trombone 129. This trombone is a pair of glass tubes, at least one of which is flexibly mounted, one slidably fitting into the other so that the length of the gas path can be controlled. When used in a bridge circuit for differential analysis, it is important that the sample from each side of the system reach the flame ion detectors at the same time and hence a change in length of flow path is desirable to permit adjustment of the flow time through the sample system. After passing through the trombone the mixture is passed to the electrode jet 130. This may be a single jet, or a concentric jet as above described. The collector electrode 131, which may be a wire screen, as above described, or of other configuration, is in the flame chamber above the flame and the conductivity of the flame is measured.

Two such flame chambers and flow systems complete are preferred so that different chromatographic columns or absorbent columns may be used and the difference in signal measured on a bridge, thus the bridge measures the difference in conductivity, and if the flow rates are symmetrical throughout, the sole difference results from the difference in treatment in the chromatographic columns or absorbent columns 127 and the concentration of the component which is absorbed can be measured directly from the bridge.

One bridge circuit is shown in which a left and a right vacuum tube 132 and 133 are connected with a filament battery 134 supplying a filament current, which filament current is controlled by a filament switch 135. The control grid of each tube is connected to its respective electrode jet. Also connected to each control grid is a grid resistor 136 which conveniently can be switched by a grid resistor switch 137 to select various values of grid resistance. The same value is usually used for each tube of the bridge. From the common point of the grid resistors a bias battery 138 is connected to give a negative bias to the control grids of the vacuum tubes with respect to the filaments. From this grid juncture is also connected a high voltage battery 139, the negative end of which is connected to the collector electrodes 131 in each flame chamber. The negative end of a plate battery 140 is also connected to the common point of the grid resistors. The positive end of the plate battery is connected to the midpoint of a bridge, conveniently consisting of a centring balance potentiometer 141, through a variable resistance 142 and a fixed resistance 143 to the plate of the vacuum tube. Conveniently the vacuum tubes may be a CK 5886 with the extra grids tied to the plate. Bridged across the two plates is a measuring potentiometer 144 across one side of which is a recorder resistor 145 and a microammeter 146, with a protective resistor forming part of the microammeter. A recorder can be connected across the recorder resistance to give a recording of the output, or the output can be measured on the microammeter and the readings recorded manually.

It is to be understood that the bridge circuit shown is one suitable bridge circuit but not the only bridge circuit which will work. Any highly sensitive electrometer circuit can be used. Electrometer circuits from ionization meters are satisfactory, and this art has developed to the point that stable circuits from ionization meters or Geiger counters can frequently be purchased as surplus at a marked savings. The details of construction of the flame ion detectors is as described earlier in the specification.

For flexibility a fixed resistor 147 and a fixed resistor switch 148 are connected across the collector electrode and the electrode jet of one of the flame ion detectors. A very high resistance, which may be $10^9$ to $10^{15}$ ohms, is used so that by closing the switch and turning off one flame, the bridge circuit can be used to measure the output of the left flame ion detector only where absolute values rather than differential values are desired.

The apparatus as shown is very versatile in that a continuous sample stream may be fed to the continuous analysis sample port 121 and one portion passed through the left and one portion passed through the right flow controls and flame ion detectors, or individual samples can be injected through the injection septum T121. Where a single sample is injected as a slug, the sample in part backs up into the reservoir 119 and displaces nitrogen through the bubbler 120 without disturbing the flow rates, or extinguishing the flame.

A chromatographic column is preferred to separate the components of a small sample. For continuous samples absorption tubes are particularly useful. One of the chromatographic or absorption columns 127 is used as a blank with no absorbent but with a volume and flow resistance equal to that of a chromatographic or absorbent column so that the flow rates are the same whether an active or inactive column is used. The other columns are conveniently designed for different analyses. One, for instance B, may have a mixture of 20% mercuric sulfate and sulfuric acid, both by weight in water, on a diatomaceous earth absorbent which thus absorbs unsaturated gases. Other columns may have glycerine on diatomaceous earth to separate the various classes such as the hydrocarbons, ethers, aromatics, aldehydes and ketones, alcohols and acids. Other columns may have a liquid phase such as methyl phosphoramide, dimethyl sulfolane or diisodecylthalate on them. Thus by changing the control valves between the manifolds a column may be selected for a particular analysis. Either differential analyses can be run, in which case the bridge gives a difference between the signals from the two columns or one detector can be turned off and the fixed resistor 147 switched in at 148 and the individual chromatographic pattern of the sample determined on the selected column. A fixed resistor having a resistance of the same order of magnitude as the flame gives good results.

In using differential analyses, it is important that the trombone be adjusted so that the flow path on each side of the bridge is the same so that comparable portions of samples are being compared. The use of balanced capillaries, balance flow meters, and generally symmetrical construction enhances the ease of such operation, although the needle valves can be adjusted to modify flow if necessary. The flows should be adjusted so that the same amount of hydrogen, air and nitrogen is being fed on each side of the bridge so that the sample will be evenly split and if the same columns are used, a balanced signal would be obtained even though the individual signals may be comparatively large.

The size sample to be used depends in part upon the sensitivity desired, and the concentrations of the materials being measured. The area under the curve is the measure of the concentration, but the height alone is usually sufficiently accurate and is measured more rapidly.

With a six foot column of glycerine on diatomaceous earth and a nitrogen flow rate of 40 milliliters per minute, as indicative of the time involved, the time from injection to methane was 1.6 minutes. The remainder of the olefins and paraffins came off within the following times after the methane peak, at 95° C.:

| Compound type: | Minutes from methane peak to peak |
|---|---|
| Olefins and paraffins | 0.0–0.2 |
| Diethyl ether | 0.2 |
| Aromatics ($C_6$ to $C_9$) | 0.5–1.2 |
| Acetates (lower alkyl) | 1.1–1.5 |
| Aldehydes and ketones | 2.0–2.5 |
| Alcohols | 9.0–14.0 |
| Carboxyl acids | over 20 |

It is to be stressed that this example is representative of the results which can be obtained. Other columns and flow rates give different absolute and relative results.

Although the apparatus has been described for certain specific uses, its use for many other purposes is apparent, wherever it is desired to determine the amount of carbon to hydrogen or carbon to halogen linkages in hydrocarbons which exist in the vapor phase or may be transformed to the vapor phase. Such usages which come within the scope of the appended claims are part of the present invention.

We claim:

1. A method for analyzing for classes of carbon-hydrogen compounds independent of the presence of carbon dioxide and water vapor which comprises passing a sample in a carrier gas through a chromatographic column having a polyglycol stationary phase, measuring the conductivity of the effluent carrier gas in a hydrogen flame, as a function of time, and evaluating serially the classes of compounds in the sample as olefins and paraffins, ethers, aromatics, aldehydes and ketones, alcohols, and acids, by measuring the area under a plotted curve of conductivity against time for separate peaks on such curve and by comparison with known standards, determining from the time of each peak the identity of such classes of compounds, and from the area of each peak, the quantity present.

2. The method of analyzing for carbon-hydrogen compounds in water which comprises passing a clean carrier gas through the water thereby eluting dissolved carbon-hydrogen compounds, and then passing the carrier gas containing such carbon-hydrogen compounds into a hydrogen flame, measuring the conductivity of the flame and evaluating as a concentration of the carbon-hydrogen compounds in the water, said conductivity being a function of the carbon-hydrogen compound content of the carrier gas, and by comparison with known standards, converting to desired units of measurement, the water vapor content of the carrier gas being immaterial.

3. The method of claim 2 which comprises passing the carrier gas after passing through the water through a chromatographic column and thereby separating the various carbon-hydrogen compounds, and plotting the conductivity of the hydrogen flame as a function of time, thus separately evaluating the various carbon-hydrogen compounds eluted from the water.

4. The method of analyzing for vaporizable carbon-hydrogen components of an aqueous system which comprises injecting a small quantity of the aqueous system into an inert carrier gas, depositing non-volatile solids on the walls of a gas transporting means while vaporizing water and volatile carbon-hydrogen components, mixing said carrier gas with hydrogen gas, burning the mixture, measuring the conductivity of the flame, and evaluating the carbon-hydrogen content of the aqueous system from the flame conductivity, by comparison with known standards.

5. The method of claim 4 in which the carbon-hydrogen components in said carrier gas are passed through a chromatographic column to differentially retard the passage of, and thus separate, and render separately measurable, the different carbon-hydrogen volatile components of the aqueous system.

6. The method of claim 5 in which the aqueous system is selected from the group consisting of (a) water suspected of pollution, (b) blood, and (c) urine.

7. The method of analyzing a body liquid selected from the group consisting of blood and urine for vaporizable carbon-hydrogen components which comprises injecting a small quantity of said body liquid into an inert carrier gas, depositing non-volatile solids on the walls of the gas transporting means, vaporizing water and volatile carbon-hydrogen components, passing said carrier gas through a gas chromatographic column, thereby differentially retarding the passage of, and thus separating, and rendering separately measurable the different volatile carbon-hydrogen components, mixing the carrier gas with hydrogen gas, burning the mixture, measuring the conductivity of the flame, selecting the conductivity peaks corresponding to each of ethanol and acetone, and from the area under the conductivity-time curve for such peak, as compared with known standards, calculating and evaluating the ethanol and acetone concentration of the said body liquid from the flame conductivity.

8. A method of detecting and following the course of diabetes comprising passing a sample of the subject's breath in a carrier gas through a chromatographic column, burning in a hydrogen flame, and measuring the conductivity of the hydrogen flame at a time corresponding to the passage of acetone and measuring the area under the conductivity-time curve for such acetone passage, and by comparison with known standards, converting to acetone concentration in the subject's breath, in desired units.

9. A method of detecting and following the course of diabetes comprising equilibrating a sample of the subject's blood with air, said equilibration consisting of permitting a volume of air to attain equilibrium conditions with said blood sample, passing a sample of the equilibrated air in a carrier gas through a chromatographic column, burning in a hydrogen flame, and measuring the conductivity of the hydrogen flame at a time corresponding to the passage of acetone and measuring the area under the conductivity-time curve for such acetone passage, and by comparison with known standards converting to acetone concentration in the subject's blood, in desired units.

10. A method of detecting and following the course of diabetes comprising equilibrating a sample of the subject's urine with air, said equilibration consisting of permitting a volume of air to attain equilibrium conditions with said urine sample, passing a sample of the equilibrated air in a carrier gas through a chromatographic column, burning in a hydrogen flame, and measuring the conductivity of the hydrogen flame at a time corresponding to the passage of acetone and measuring the area under the conductivity-time curve for such acetone passage, and by comparison with known standards, converting to acetone concentration in the subject's urine, in desired units.

11. A method of measuring the change with time of the concentration of the carbon-hydrogen and carbon-halogen components of a gas which comprises passing one stream of said gas through a first flame ionization detector, passing a second stream through a delay passage so that the second stream is measured at a constant time delay with respect to the first stream, then passing said second stream through a duplicate second flame ionization detector, said flame ionization detectors being connected in a bridge circuit wherein the signals oppose, and reading the signal difference, which gives a direct reading of the difference in concentration of the carbon-hydrogen and carbon-halogen content of said first stream and the time delayed said second stream, thus showing the change in said concentration over the time of the delay.

12. The method of determining the alcohol content of the human breath, independent of carbon dioxide and water vapor present which comprises passing a portion of expired human breath through a gas chromatographic column in a carrier stream consisting essentially of an inert gas, eluting the carbon-hydrogen components of the breath in time order, passing the carrier gas containing said components through a hydrogen-oxygen flame, measuring the conductivity of the flame as a function of time, and plotting the same, thus differentiating between alcohol and other volatile carbon-hydrogen containing compounds in the breath, and measuring the area under the conductivity-time curve corresponding to the alcohol peak, and by comparison with known standards, converting to a measurement in desired units.

13. The method of claim 12 in which acetone and ethyl alcohol are separately evaluated to distinguish between diabetics and intoxicated persons.

14. A method of detecting and following the course of diabetes in a subject comprising selecting an acetone containing sample of air from the group consisting of the subject's breath, air equilibrated with a sample of the subject's blood and air equilibrated with a sample of the subject's urine, said equilibration consisting of permitting a volume of air to attain equilibrium conditions with said sample of blood or urine, passing the sample of air in a carrier gas through a gas chromatographic column, burning in a hydrogen flame, and measuring the conductivity of the hydrogen flame, plotting the conductivity as a function of time, and by comparison with known standards, selecting the peak corresponding to the time of passage of acetone, and measuring the area under the conductivity-time curve for such acetone peak, and by comparison with known standards, converting to acetone concentration in the subject in desired units.

References Cited

UNITED STATES PATENTS

| | | | |
|---|---|---|---|
| 2,192,525 | 3/1940 | Rosaire et al. | 23—232 |
| 2,591,691 | 4/1952 | Forrester | 23—232 |
| 2,901,329 | 8/1959 | Kapff | 23—232 |
| 2,991,158 | 7/1961 | Harley | 23—232 |
| 3,049,409 | 8/1962 | Dower | 23—232 |
| 2,084,954 | 6/1937 | Griswold | 23—232 |
| 2,371,637 | 3/1945 | McDermott | 23—230 |
| 2,511,177 | 6/1950 | Richardson | 23—255 |
| 2,733,135 | 1/1956 | Huckabay | 23—230 |
| 2,879,663 | 3/1959 | Thomas | 73—26 |
| 3,039,856 | 6/1962 | McWilliam | 23—232 |
| 3,118,735 | 1/1964 | Favre et al. | 23—232 |

OTHER REFERENCES

Weeks, Jr., Mechanix Illustrated, pp. 82, 83, 142, December 1949.

Ray, Nature, pp. 403–405, August 31, 1957.

Heaton et al., Anal. Chem. 31, 349–356, March 1959.

JOSEPH SCOVRONEK, *Primary Examiner.*

MORRIS O. WOLK, *Examiner.*

D. E. GANTZ, *Assistant Examiner.*